United States Patent [19]

Katz et al.

[11] Patent Number: 5,422,744
[45] Date of Patent: Jun. 6, 1995

[54] BAR CODE INCORPORATED INTO HOLOGRAPHIC DISPLAY

[75] Inventors: Joseph Katz, Stony Brook; Emanuel Marom, Stony Brook; Boris Metlitsky, Stony Brook; Jerome Swartz, Old Field; Ynjiun Wang, Stony Brook, all of N.Y.

[73] Assignee: Symbol Technologies, Inc., Bohemia, N.Y.

[21] Appl. No.: 897,772

[22] Filed: Jun. 12, 1992

[51] Int. Cl.⁶ .......................... G03H 1/00; G06K 7/10
[52] U.S. Cl. ........................ 359/2; 235/440; 235/454
[58] Field of Search ............. 359/2, 3, 22, 27, 32; 283/57, 72, 82, 86, 91, 904; 235/435, 439, 440, 449, 454

[56] References Cited

U.S. PATENT DOCUMENTS

| | | | |
|---|---|---|---|
| 3,704,949 | 12/1972 | Thomas et al. | 356/71 |
| 3,894,756 | 7/1975 | Ward | 283/7 |
| 4,041,279 | 8/1977 | Foote | 235/440 |
| 4,150,781 | 4/1979 | Silverman et al. | 235/382 |
| 4,269,473 | 5/1981 | Flothmann et al. | 359/3 |
| 4,641,017 | 2/1987 | Lopata | 235/457 |
| 4,684,795 | 8/1987 | Colgate, Jr. | 235/449 |
| 4,873,426 | 10/1989 | Sarna et al. | 235/462 |
| 4,889,366 | 12/1989 | Fabbiani | 283/86 |
| 4,945,215 | 7/1990 | Fukushima et al. | 235/457 |
| 4,963,756 | 10/1990 | Quan et al. | 250/566 |
| 4,988,154 | 1/1991 | Hansen | 359/27 |
| 5,059,776 | 10/1991 | Antes | 235/457 |
| 5,095,194 | 3/1992 | Barbanell | 235/379 |
| 5,138,468 | 8/1992 | Barbanell | 359/2 |
| 5,145,212 | 9/1992 | Mallik | 283/72 |
| 5,306,899 | 4/1994 | Marom et al. | 235/382 |
| 5,336,871 | 8/1994 | Colgate, Jr. | 235/380 |

Primary Examiner—Loha Ben
Assistant Examiner—Darryl Collins
Attorney, Agent, or Firm—Fish & Richardson

[57] ABSTRACT

In order to improve security for holographic labels which are positioned on a substrate base, a bar code symbol with regions of different light reflective properties is holographically recorded on the base. The base may be, for example an information card, such as a credit card, a label, or a container for a product. The bar code symbol can be recorded so that it is visible to the eye in white light (e.g., as a rainbow hologram) or so that it requires an appropriate reference beam for reconstruction. A reading apparatus (e.g., a bar code reader) directs light at the holographic bar code symbol and detects the reflected optical information with a detector such as a CCD array. The reading apparatus can be a stand-alone device or, in the case of a credit card, can be incorporated into a conventional swiper for reading magnetic information on a strip on the card. A non-holographic bar code symbol can also be provided on or near a holographic display element, e.g., a rainbow hologram. The bar code can be positioned adjacent the display, or placed in a window within the display, or etched or embossed on the display. A system is also provided for authenticating a holographic display on an information card such as a credit card. A display is illuminated and a reflected beam directed at a holographic record which was previously produced from a signal, known to be authentic, and a reference. The reflected beam is used to reconstruct a reference beam. A sensor receives the reconstructed reference and it is then determined if the display is authentic.

5 Claims, 4 Drawing Sheets

BAR CODE INCORPORATED INTO HOLOGRAPHIC DISPLAY

This application is related to the Marom et al. application entitled "Hologram Authentication" filed on even date herewith.

CROSS REFERENCE TO RELATED APPLICATIONS

This application is related to U.S. Pat. No. 5,306,899, issued Apr. 26, 1994.

BACKGROUND OF THE INVENTION

This invention relates to holographic display elements used for authentication and to the use of bar codes for identification and authentication.

In order to discourage the fraudulent manufacture of information cards, such as credit cards, card manufacturers produce a card that includes a holographic display. A hologram is a recording of an interference pattern between two beams of light, usually referred to as the signal beam and the reference beam. The signal beam usually includes the image to be recorded, and the reference beam is a beam of light, usually of constant distribution, i.e., plane of spherical wavefront. Typically, another reference beam, similar to the one used to record the hologram, is used to reconstruct the signal beam, which then produces an identifiable image. For many holograms, one cannot identify an image without reconstruction.

The holograms typically used on credit cards are what are known as rainbow holograms. They are produced by placing the image to be recorded near the surface of the holographic substrate during recording. These holograms are visible in ordinary, white light and should be familiar to most holders of credit cards. The rainbow hologram can be mass produced on sheets of metalized embossing substrate, and stamped onto credit cards. Such holograms are a deterrent to counterfeiting because the production requires an expensive manufacturing investment.

Some identification cards, e.g. some library cards, provide individual information about a cardholder with a code such as a bar code symbol. Bar code symbols are formed from bars or elements that are typically rectangular in shape with a variety of possible widths. The specific arrangement of elements defines the character represented according to a set of rules and definitions specified by the code or "symbology" used. The relative size of the bars and spaces is determined by the type of coding used, as is the actual size of the bars and spaces. The number of characters per inch represented by the bar code symbol is referred to as the density of the symbol. To encode a desired sequence of characters, groups of elements are concatenated together to form the complete bar code symbol, with each character of the message being represented by its own corresponding group of elements. In some symbologies a unique "start" and "stop" character is used to indicate where the bar code begins and ends. A number of different bar code symbologies exist. These symbologies include, e.g., UPC/EAN, Code 39, Code 49, Code 128, Codabar, Interleaved 2 of 5, etc.

In order to increase the amount of data that can be represented or stored on a given amount of surface area, several new bar code symbologies have recently been developed. One of these new code standards, PDF417, introduces a "two-dimensional" concept by stacking rows of characters vertically instead of extending the bars horizontally. That is, there are several rows of bar and space patterns, instead of only one row. Thus, bar codes include not only the traditional rectangularly-shaped bars and spaces, but any form of symbol in which different portions of the symbol have different light reflecting characteristics.

Bar codes are scanned to transform the graphic symbol elements into electrical signals, which are then decoded into characters. A scanning system uses a light source, typically a gas or semiconductor laser, which is directed to the symbol or bar code by a lens or other optical components. The scanner functions by repetitively scanning the light beam in a path or series of paths across the symbol. Scanning systems also include a sensor or photodetector which detects light reflected from the symbol. A portion of the reflected light is detected and converted into an electrical signal, and electronic circuitry or software decodes the electrical signal into a digital representation. The symbol is decoded according to the coding technique used, e.g., the Uniform Product Code (UPC) on many supermarket items.

SUMMARY OF THE INVENTION

In a first aspect, the invention features a label with a bar code symbol holographically recorded. In preferred embodiments, the symbol can be a rainbow hologram visible in white light, or may be holographically recorded so that the symbol is only visible when reconstructed with an appropriate reference beam. The symbol can alternatively be realized as a series of gratings which cause bursts of light to be reflected when illuminated. The holographically recorded bar code symbol may include in the same hologram a graphic display element, or such a display element may be separately positioned on the same base on which the element is positioned. The label can be positioned on a product, or on the plastic base of an identification card, or affixed to any other label, material or object to be identified.

In a second aspect, the invention features a bar code reader for reading a holographic bar code symbol on a label. In preferred embodiments, the symbol may be reconstructed with an appropriate reference beam and a real image obtained. A detector, such as a CCD array can be used to receive the real image and circuitry to process the output of the CCD array. Alternatively, a detector and relay lens can be positioned to receive a virtual image of the symbol.

In a third aspect, the invention features an object, such as a credit card, which includes a holographic display element and a bar code symbol positioned in proximity to the display element. The display element and symbol are preferably covered by a transparent layer of material. The display element discourages counterfeiting by making the card more expensive for counterfeiters to produce, and the bar code symbol adds additional security while providing information. The bar code symbol in these embodiments can be read with a conventional flying spot scanner without interference from the element.

In a fourth aspect, the invention features an apparatus for reading both the magnetic information stripe of an information card and a bar code symbol in a single swipe. In preferred embodiments, the illumination source and detection apparatus can be placed within or next to a swiper used to read magnetic information, such that the bar code symbol can be read in the same swiping motion used to read the magnetic information. This arrangement would enable one to obtain optical information without extra steps and separate pieces of equipment.

Other features and advantages of the invention will be apparent from the following description of a preferred embodiment, and from the claims.

DESCRIPTION OF THE PREFERRED EMBODIMENTS

Figure 1:
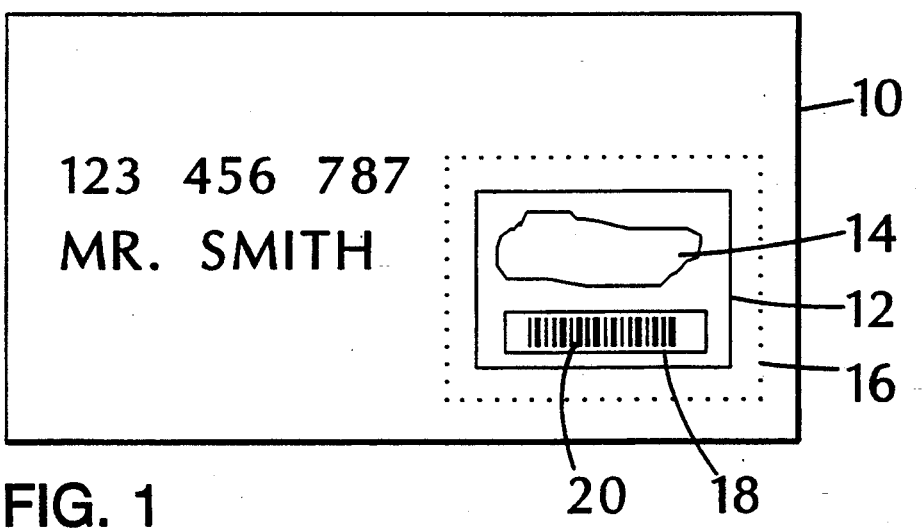
FIGS. 1-3 are pictorial representations of holographic displays with incorporated bar code.

Referring to FIG. 1, holographic display element 12 is positioned on a substrate base, for example, a credit card 10. Display element 12 is a rainbow hologram with an image 14 embossed as an interference pattern in a polymeric film. The image, which may be of most any form, has a three-dimensional appearance. Display element 12 has a window 18 which is cut out of the display, and a symbol with regions of different light reflective properties, such as bar code symbol 20, is printed in this window. The combination of display element 12 and bar code symbol 20 is covered by transparent lamination cover 16.

Figure 2:
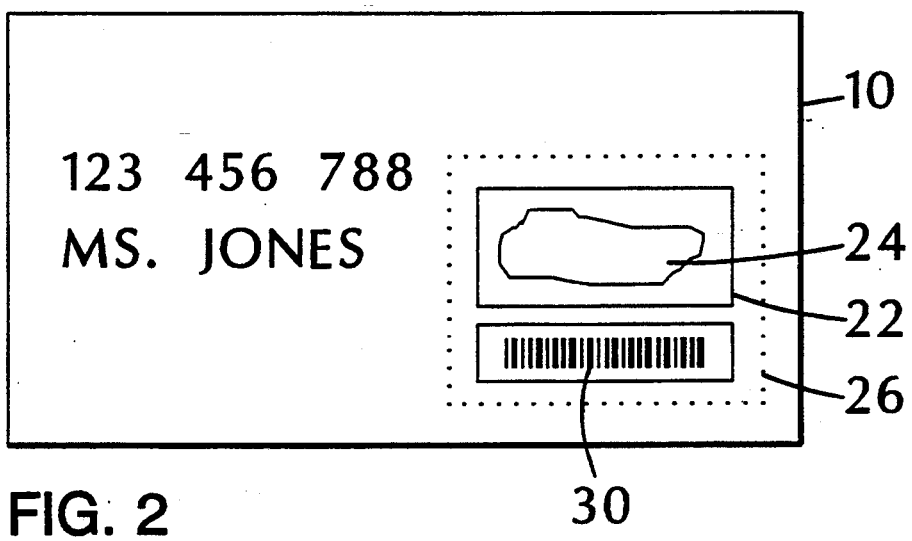

In the embodiment in FIG. 2, credit card 10 includes display element 22 with image 24. Bar code symbol 30 is positioned next to display element 22. The image and bar code are covered together with transparent lamination cover 26. With this arrangement of bar code symbol and display element, there is no need to cut the polymeric film forming the holographic display element.

Figure 3:
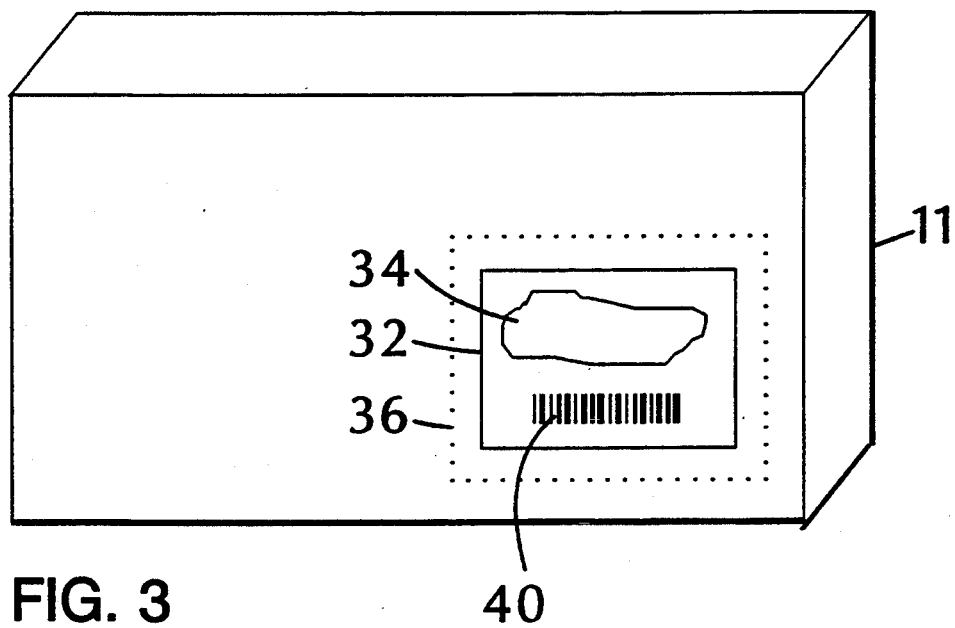

FIG. 3 shows a display element 32 with image 34 and a bar code 40 which has been printed directly on top of the polymeric film of the holographic display, and positioned on a box 11. The bar code could be printed on a specially prepared area reserved for a bar code, or even directly on top of the holographic region of the polymeric film. The bar code 40 could also be etched or embossed in the polymeric film, rather than printed. In this case, the density of the etching or embossing should be lower than that of the holographic process so that the information carried by the barcode could be easily separated.

These embodiments have several advantages. The holographic display element can be mass produced and stamped onto a credit card, or on some other object, such as a product container, at relatively low cost. The bar code symbol can be added easily, and can include individual information specific to each card or product. A conventional flying spot scanner can be used to read the bar code symbol without interference from the holographic process, and the bar code symbol does not interfere with the holographic display element.

Figure 4:
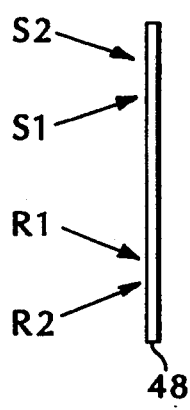
FIG. 4 is a pictorial view of two reference beams and two signal beams.

Referring to FIG. 4, a bar code is holographically recorded on the holographic display along with another object. Two references, R1 and R2, and two corresponding signals, S1 and S2, are represented in the recording stage of forming a hologram 48. To holographically record S1, reference bean R1 is directed at holographic material of hologram 48. When reconstructed, R1 is again directed at the hologram and the image S1 is reconstructed. Two objects, corresponding to S1 and S2, can both be holographically recorded separately or at the same time. Either S1 or S2 can be reconstructed, depending on which reference, R1 or R2, is directed at the hologram. Thus S2 can represent some image, such as an eagle, and S1 a bar code symbol, or vice versa.

The bar code symbol can be recorded like another rainbow hologram, i.e. near the surface and visible in white light, or embossed on the polymeric film. Alternatively, the bar code could be recorded so that it is only detectable when a particular reference beam is directed toward the display, while another image on the display is recorded to be visible in white light. This approach, however, would require different recording techniques and may make the hologram more difficult to manufacture or replicate.

Figure 4A:
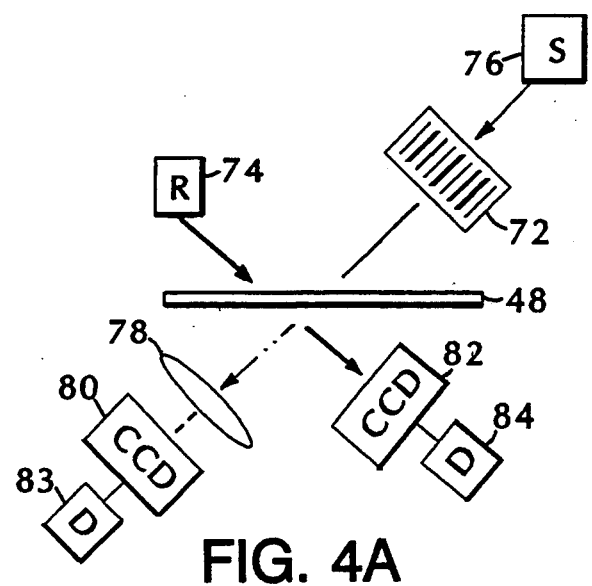
FIG. 4A is a schematic of an apparatus to reconstruct a bar code holographically recorded.

Referring to FIG. 4A, hologram 48 includes a holographic bar code made from reference source 74 and signal source 76 illuminating at bar code 72. To reconstruct, a reference beam from reference source 74 is directed at the hologram and the reconstructed beam is received by a detection apparatus at 80 or 82 if the substrate is transparent. If a CCD camera is used at detection position 80, preceded by relay lens 78, a virtual image can be detected. The virtual image appears as if it were at the previous location of bar code 72. If a real image is desired, it can be observed by a CCD camera at detection position 82. The detection apparatus, whether receiving a real or virtual image, also includes appropriate circuitry 83 or 84 for electro-optically converting the information received at the CCD camera to a series of electrical signals which are decoded and converted to characters.

Figure 5:
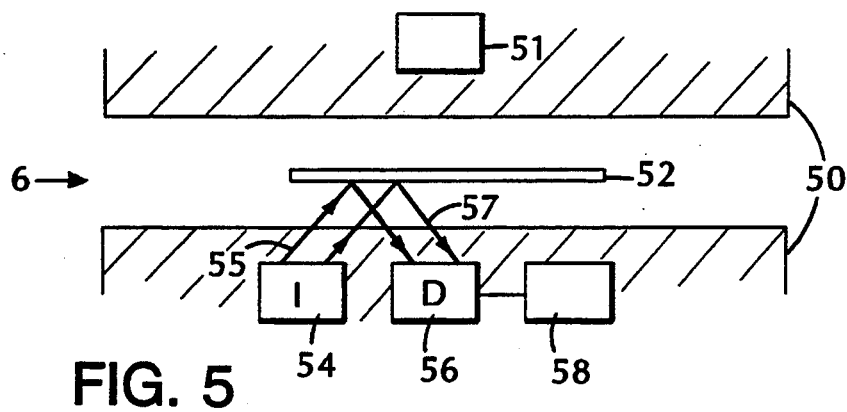
FIG. 5 is an optical reader within a magnetic swiper channel.

Frequently, identification cards, such as credit cards, have a magnetic information strip which is read by being swiped through a channel that includes a magnetic reading apparatus. Referring to FIG. 5, an optical reader is positioned within a magnetic swiper channel with magnetic reading apparatus represented generally at 51. Card 52 is shown between two sides of swiper 50. An illumination source 54 directs a beam or series of beams 55 at a holographic record in the form of a reflective strip (not shown) alongside the strip or possibly superimposed over the strip. The reflected beams 57 are received by CCD array detector 56, and information is converted to electrical signals by circuitry 58. Other optical elements, such as lenses (not shown), could also be included.

Figure 6:
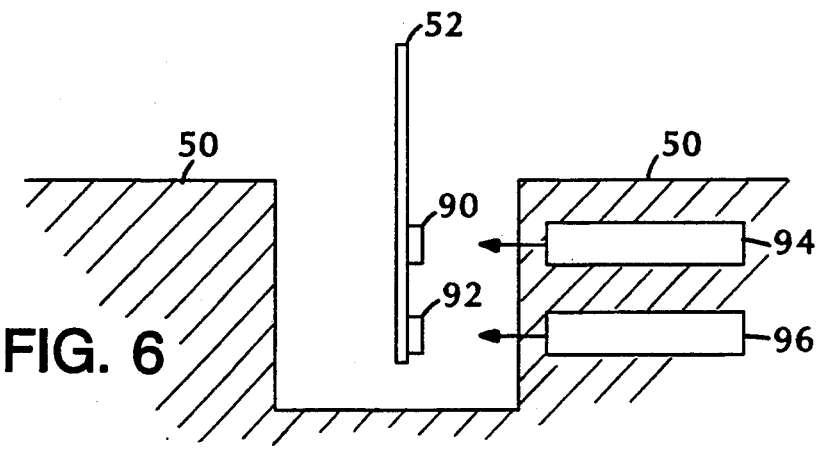
FIG. 6 is a pictorial view of a card in a swiper channel with both magnetic and optical readers, taken through plane 6 of FIG. 5.

A side view of the apparatus of FIG. 5 is shown in FIG. 6 (not drawn to scale), which shows card 52 in the swiper channel with side walls 50. Card 52 has optically readable symbol 90 and magnetic stripe 92. Within the side 50 is an optical detector 94 and magnetic information detector 96. As this figure indicates, both sets of information can be positioned on the card with a compatible reading apparatus for reading both optically and magnetically encoded data. The readers could also be in different walls, so that the optically readable information can be on one side of the card, and magnetic on the other since many credit cards have holographic displays and magnetic stripes on reverse sides of the card. Alternatively, the optical reader could be mounted on top of the swiper thus increasing the height of sidewalls 50. This system could be used with a non-holographic bar code symbol or with a holographically produced bar code symbol used to provide added information or to authenticate the display.

Figure 7:
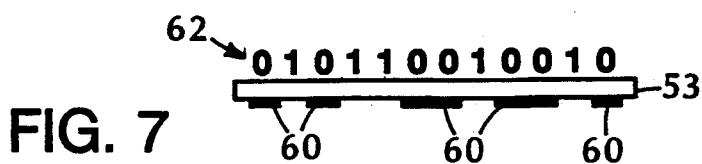
FIG. 7 is a pictorial representation of an identification card with gratings.

FIG. 7 shows a side view of a credit card 53 with gratings 60 (not drawn to scale). Using a similar apparatus as that shown in FIG. 5, these gratings will produce reflected bursts of light which can be read in a manner similar to a bar-type code, i.e. a sequence of zeros and ones corresponding to dark and light as represented at 62. If gratings are used, a motorized swiper can be used to direct the card at a constant rate, or a separate parallel set of equally spaced gratings for synchronization purposes can be added which also produce bursts. Either option would improve the reading since the location and length of each burst is important.

Figure 8:
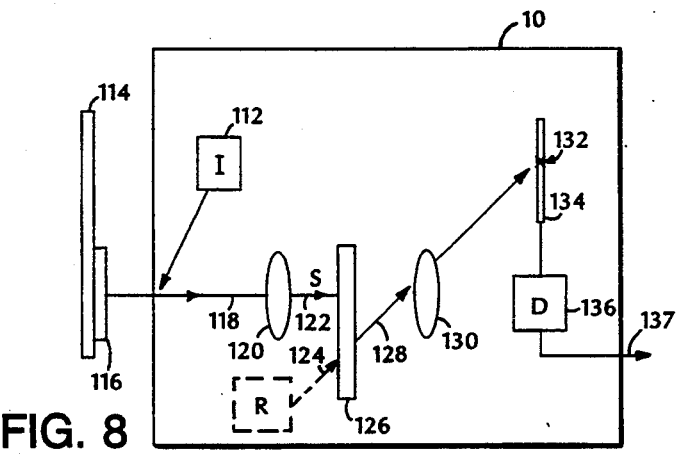
FIG. 8 is a pictorial representation of a system to authenticate a holographic display.

FIGS. 8–11 show a holographic authentication system 110. Referring to FIG. 8, the authentication system includes an illumination source 112, preferably a laser diode or a light emitting diode, which is positioned to direct a beam of light to credit card 114, which includes holographic display element 116. Reflected beam 118 is focused by lens 120, and results in signal beam 122, which is thus directed to holographic record 126.

Holographic record 126 has been prepared in advance with a reference beam 124, represented in phantom, and from a signal beam produced from a holographic display element which was known to be authentic or valid. Holograms are often used to reconstruct a signal beam by directing the reference beam at the hologram. In this case, however, signal beam 122 is used in an attempt to reconstruct reference beam 124. Beam 128, which is the reconstruction of the reference beam actually produced by directing signal beam 122 at the record 126, is essentially a beam that carries the correlation of the two signals. This beam is focused by lens 130 onto CCD array sensor 134. The light distribution received by sensor 134 is evaluated by detection circuitry 136, which determines from the presence of a strong signal whether the pattern indicates an authentic display and outputs a result represented at 137.

Figures 9A, 9B:
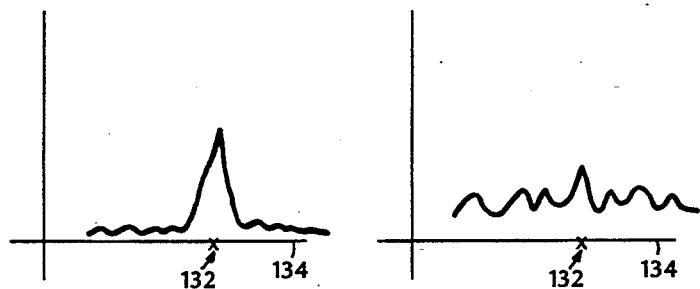
FIGS. 9A and 9B represent patterns that might appear in an image plane for an image with satisfactory and unsatisfactory correlation, respectively.

If signal beam 122 is sufficiently similar to the signal used to record holographic record 126, i.e., if the display element is authentic, then the reconstructed reference beam 128 will essentially be the original reference beam 124 used to record the holographic record multiplied by the correlation between the stored and observed targets. Furthermore, a location point 132 can be identified where the reconstruction of the reference beam would be expected. FIGS. 9A and 9B illustrate light distribution patterns that arise at CCD array sensor 134 for authentic and non-authentic elements, respectively. A sharp peak in the light distribution pattern at point 132, as shown in FIG. 9A, indicates a strong correlation between the beam 122 used in recording the hologram and that used as the read-out. Referring to FIG. 9B, a light distribution pattern which lacks a significant peak at point 132 indicates poor cross-correlation between the object and the reconstruction beams. In this case, the signal beam 122 reflected from holographic display element 116 is unacceptably different from the signal beam used to make holographic record 126, and therefore the display element is considered non-authentic.

Figure 10:
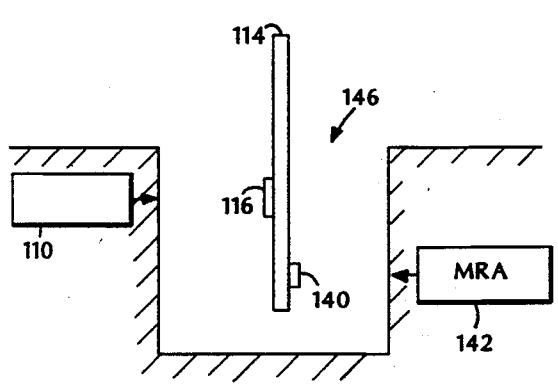
FIGS. 10 and 11 are pictorial views of an optical authentication apparatus in or adjacent a magnetic swiping channel.

Referring to FIG. 10 (not drawn to scale), information card 114 includes holographic display element 116 and magnetic stripe 140 which includes individual cardholder and other information. A magnetic reading apparatus 142 reads the magnetic information when card 114 is swiped through swiper channel 146. Optical authentication apparatus 10 (FIG. 8) is also positioned in the swiper channel to authenticate the hologram during the same swiping action.

Figure 11:
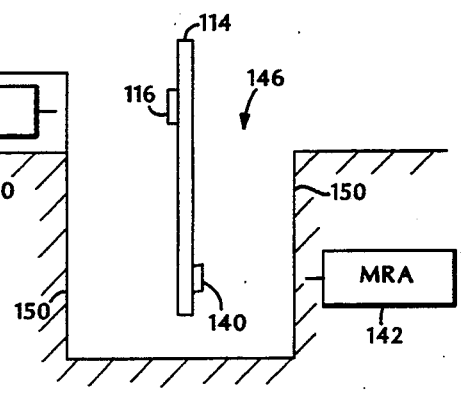

FIG. 11 shows a similar apparatus to that in FIG. 10 except that the authentication apparatus 110 is positioned over the sidewalls 150 of the channel, rather than within one sidewall. The authentication apparatus 10 could also be a stand-alone system, and not incorporated in another device.

The hologram authentication features of the embodiments of FIGS. 8–11 can be combined with features of the embodiments of FIGS. 1–7.

Figure 12:
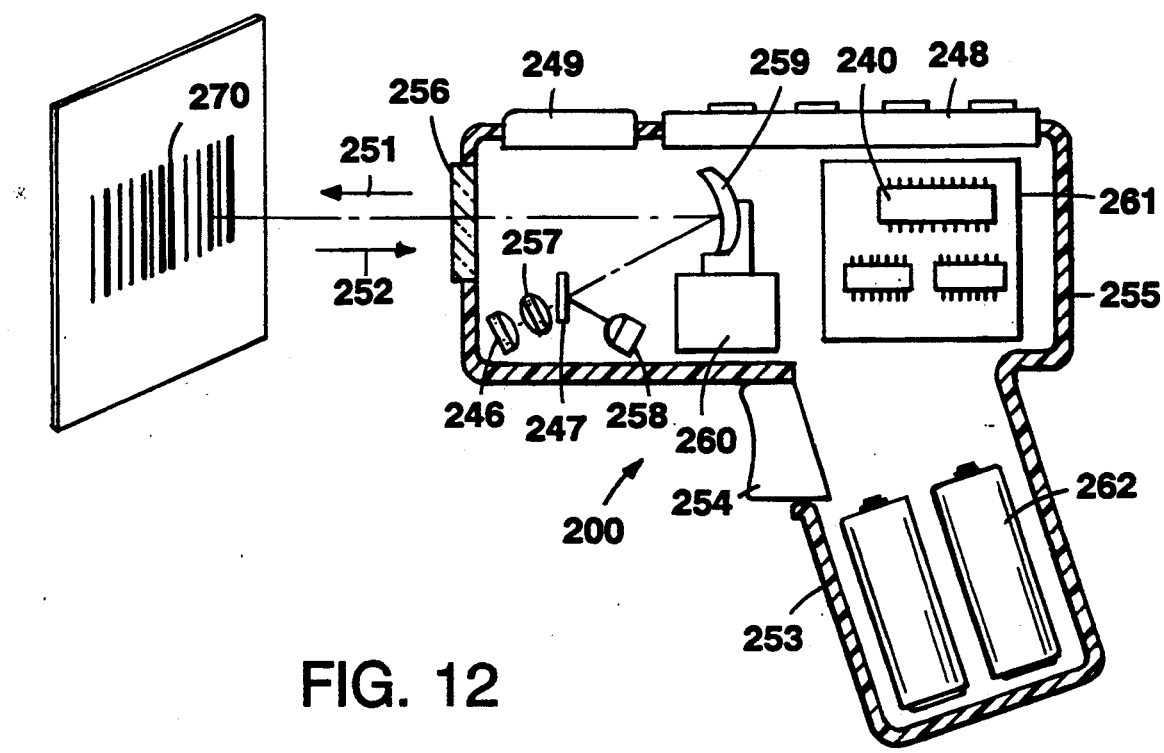
FIG. 12 is a diagrammatic view of a bar code reader.

Bar code readers of the general type shown in FIG. 12 could be adapted to read bar code symbols incorporated into holographic displays, and to incorporate the above-described hologram authentication apparatus.

FIG. 12 illustrates a typical exemplary embodiment of a bar code reader unit 200 implemented as a gun-shaped device, having a pistol-grip type of handle 253. A movable manually actuated trigger switch 254 is employed to allow the user to activate the light beam 251 and detector circuitry, typically after the time when the user has positioned the device to point at the symbol to be read. A lightweight plastic housing 255 contains the laser light source 246, the detector 258, the optics and signal processing circuitry and the CPU 240, mounted on circuit board 261, as well as a power source or battery 262. A light-transmissive window 256 in the front end of the housing 255 allows the outgoing light beam 251 to exit and the incoming reflected light 252 to enter. The reader 200 is designed to be aimed at a bar code symbol 270 by the user from a position in which the reader 200 is spaced from the symbol, i.e., not touching the symbol or moving across the symbol. Typically, this type of hand-held bar code reader is specified to operate in the range of perhaps several inches or even further.

The reader 200 may also function as a portable computer terminal, and in such embodiments includes a keyboard 248 and a display 249, such as described in U.S. Pat. No. 4,409,470.

As further depicted in FIG. 12, a suitable lens 257 (or multiple lens system) may be used to focus the scanned beam into a scanning spot at an appropriate reference plane. A light source 246 such as a semiconductor laser diode is positioned to introduce a light beam into the axis of the lens 257, and the beam passes through a partially-silvered mirror 247 and other lenses or beam-shaping structure as needed. The beam is reflected from an oscillating mirror 259 which is coupled to a scanning motor 260 which is energized when the trigger 254 is pulled. If the light produced by the source 246 is marginally visible, an aiming light may be included in the optical system. The aiming light if needed, produces a visible-light spot which may be fixed, or scanned just like the laser beam; the user employs this visible light to aim the reader unit at the symbol before pulling the trigger.

Other embodiments of the invention are within the scope of the following claims.

What is claimed is:

1. A bar code reader for reading a bar code symbol holographically recorded in a holographic element on a substrate base, said apparatus comprising:
   a structure including a channel sized and configured to receive said substrate base;
   an illumination source mounted with respect to said structure and positioned to direct light at said holographic element;
   a detector mounted with respect to said structure and positioned to receive a holographic reconstruction of said symbol;
   said detector including an optical sensor for receiving optical information from said reconstruction and converting said optical information into electrical signals;
   said illumination source and said optical scanner being so positioned and configured that said optical sensor receives said holographic reconstruction as said substrate is moved along said channel.

2. The apparatus of claim 1 wherein said detector is positioned to receive a virtual image of said symbol, and said apparatus further includes at least one optical element for directing said virtual image to said detector.

3. The apparatus of claim 2 wherein said optical element comprises a relay lens.

4. The apparatus of claim 1 wherein said detector is positioned to receive a real image of said symbol.

5. The apparatus of claim 2 or 4 wherein said optical sensor comprises a CCD array.